United States Patent Office 3,104,206
Patented Sept. 17, 1963

3,104,206
PROCESS FOR ENZYME PURIFICATION
Ralph A. Messing, Somerville, N.J., assignor to
Ethicon, Inc., a corporation of New Jersey
No Drawing. Filed Oct. 18, 1961, Ser. No. 145,984
8 Claims. (Cl. 195—66)

This invention relates to plant protease and, more particularly, to the preparation of plant proteases from raw material.

The raw materials, which at the present time constitute the main source of plant enzymes, contain large quantities of associated carbohydrates of high molecular weight, such as pectin. While chemical processes are known for the separation of relatively pure plant enzymes from such raw materials, these processes are costly and result in a relatively low yield of the desired plant protease. The low yield may perhaps be due to the oxygen sensitivity of the sulfhydryl groups present in such plant proteases.

This invention has, among its objects, the isolation of plant proteases from enzyme preparations containing the same.

I have discovered a comparatively simple and inexpensive method for isolating plant proteases from carbohydrate-containing raw material. My method furnishes a purified product in high yield. Briefly described, the process involves contacting a solution of the plant protease with a tin oxide gel, whereby impurities associated with the plant protease are removed. Preferably, the tin oxide gel is formed in situ, and then removed from the enzyme solution by filtration or centrifugation.

A tin oxide may be readily formed in situ at a pH below 7 by treating a water-soluble stannous salt with an alkali. Suitable stannous salts are stannous acetate and stannous chloride. Alkaline materials that are suitable for increasing the pH and precipitating the tin oxide gel are ammonium hydroxide, sodium hydroxide, sodium monohydrogen orthophosphate, etc. The tin oxide gel so formed is believed to have the empirical formula $SnO \cdot xH_2O—SnO_2 \cdot xH_2O$ After the purified enzyme solution is separated from the tin oxide gel, it may be further treated by passing it through a glass column filled with a granular hydrophilic insoluble substance made by crosslinking the polysaccharide dextran. Such a product is manufactured by Pharmacia of Upsala, Sweden, under the trade name "Sephadex G-25." This product is non-ionic in character and its polar properties are almost entirely due to the high content of hydroxyl groups. As the enzyme solution passes through the column, the three dimensional network of polysaccharide chains acts as a molecular sieve to remove impurities that differ greatly in size from the plant protease. The use of such crosslinked polysaccharides in a water-swollen condition has been referred to in the literature as "gel 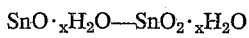tion."

It is an important advantage of my process that the tin oxide gel will leave the purified plant protease in its reduced form and therefore activated. This makes it unnecessary to add the activator to the purified enzyme prior to use.

The following examples disclose particular steps and conditions within the scope of this invention, but it is to be understood that these examples are given only by way of illustration and not limitation.

EXAMPLE I

Pinguinain

To 50 milliliters of viscous Cuban *Bromelia pinguin* juice (pH 3.9) is added 250 milligrams of $SnCl_2 \cdot 2H_2O$. The pH following addition of the stannous chloride is 3.0. An 0.2 M sodium hydroxide solution is added slowly to form the $SnO \cdot xH_2O—SnO_2 \cdot xH_2O$ gel. The addition of sodium hydroxide is stopped when the pH of the gel is 6.0. The solution plus gel is filtered through filter paper on a Buchner funnel. The gal is washed with water. The filtrate plus the washings contains over 80% of the enzyme activity and is free of all viscous carbohydrates.

The gel is insoluble in water and contains the viscous carbohydrate. The carbohydrate may be freed of the tin oxide by putting the gel into solution with acid or ethylenediamine tetraacetic acid.

EXAMPLE II

Pinguinain

A suspension of 300 milligrams of $SnCl_2 \cdot 2H_2O$ in 10 milliliters of water is added with constant stirring to 50 milliliters of pinguin juice (azocoll activity 55,000 u./ml.) that contains fiber and debris particles. The pH of the juice, initially 3.8, is 3.15 after this addition. The pH is then adjusted to 6.25 with approximately 30 milliliters of 1 molar ammonium hydroxide. The gel that forms is broken by continuous stirring, and the mixture is filtered through Whatman #54 paper on a Buchner funnel. The residue is washed with 20 milliliters of water, and the wash is combined with the filtrate. The residual tin oxide gel is then discarded.

The combined filtrate and wash is passed through a column containing granular hydrophilic insoluble substance made by crosslinking the polysaccharide dextran. The effluent from this column is then lyophilized. The product weighs 828 milligrams and has an azocoll activity of 2640 u./mg. which represents 80% of the original activity.

EXAMPLE III

Papain

A dispersion containing 9.0 grams of dried papaya latex (azocoll activity 370 u./mg.) is brought to a volume of 55 milliliters with water, and a suspension of 300 milligrams of $SnCl_2 \cdot 2H_2O$ in 10 milliliters of water is added. The pH of the enzyme dispersion drops from 4.8 to 3.9 with the addition of the tin salt. The pH is adjusted to 6.75 by the addition of 10 milliliters of 1 molar ammonium hydroxide, and the mixture is filtered over Whatman #52 paper on a Buchner funnel. The residue is washed with 20 milliliters of water, and the wash is combined with filtrate. The combined solution is passed through a column containing a granular hydrophilic insoluble substance made by crosslinking the polysaccharide dextran. The effluent from this column is then lyophilized.

The product contains 92% of the original activity, weighs 3.25 grams and has an azocoll value of 945 u./mg.

EXAMPLE IV

Ficin

To 25 milliliters of ficus latex (azocoll activity 20,350 u./ml.) is added 5 milliliters of a suspension containing 125 milligrams $SnCl_2 \cdot 2H_2O$. The pH of the latex falls from 5.4 to 4.3 with the addition of the tin chloride. The pH is brought to 6.85 by the addition of 29.5 milliliters of 0.1 molar sodium monohydrogen orthophosphate. The mixture is centrifuged and the precipitate is discarded.

The clear supernatant fluid is passed through a column containing a granular hydrophilic insoluble substance made by crosslinking the polysaccharide dextran. The effluent from this column is then lyophilized. The dried fraction weighs 258 milligrams and has an azocoll activity of 1180 u./mg. Sixty percent of the latex activity is recovered in this product.

EXAMPLE V

Bromelain

A 2.5-gram quantity of crude bromelain with an azocoll activity of 76 u./mg. is dissolved in 23 milliliters of water. A 5 milliliter suspension containing 150 milligrams $SnCl_2 \cdot 2H_2O$ in water is added to the enzyme solution. The pH falls from 4.9 to 3.15. The pH is adjusted to 6.4 by the addition of 2.5 milliliters of 1 molar sodium hydroxide and the mixture is filtered through Whatman #52 paper on a Buchner funnel. The precipitate is discarded. The filtrate is passed through a column containing a granular hydrophilic insoluble substance made by crosslinking the polysaccharide dextran. The effluent from this column is lyophilized. The dried powder weighs 674 milligrams and has an azocoll activity of 182 u./mg. Approximately 65% of the original activity is contained in this fraction.

TABLE I

*Milk Clotting Activities of Crude and Purified Enzymes*

| Enzyme (azocoll activity): | Milk clotting activity (u./g.) |
|---|---|
| Dried papaya latex (370 u./mg.) | 295 |
| Purified papain (945 u./mg.) | 565 |
| Crude bromelain (76 u./mg.) | 395 |
| Purified bromelain (182 u./mg.) | 980 |
| Purified ficin (1180 u./mg.) | 1565 |

Many details of procedure may be varied within a wide range without departing from the principles of this invention and it is, therefore, not my purpose to limit this patent otherwise than necessitated by the scope of the appended claims.

What is claimed is:

1. A process for the purification of plant proteases which comprises the steps of:
    mixing a water-soluble stannous salt with a solution of the plant protease to be purified;
    adding an alkali in sufficient quantity to increase the pH of the solution and form a tin oxide gel; and
    separating the water-soluble plant protease from the tin oxide gel.

2. A process for the purification of plant proteases which comprises the steps of:
    mixing stannous chloride with a solution of the plant protease to be purified;
    adding an alkaline salt in sufficient quantity to increase the pH of the solution and form a tin oxide gel; and
    separating the water-soluble plant protease from the tin oxide gel.

3. A process for separating the enzyme pinguinain from Cuban *Bromelia pinguin* juice which comprises the steps of:
    mixing stannous chloride with the pinguin juice;
    adding sodium hydroxide in sufficient quantity to increase the pH of the solution and form a tin oxide gel; and
    separating the water-soluble pinguinain from the tin oxide gel.

4. A process for separating the enzyme papain from a dispersion of papaya latex which comprises the steps of:
    mixing stannous chloride with the dispersion;
    adding ammonium hydroxide in sufficient quantity to increase the pH of the dispersion and form a tin oxide gel; and
    separating the water-soluble papain from the tin oxide gel.

5. A process for separating the enzyme ficin from fiscus latex, which comprises the steps of:
    mixing stannous chloride with the ficus latex;
    adding sodium monohydrogen orthophosphate in sufficient quantity to increase the pH of the mixture and form a tin oxide gel; and
    separating the water-soluble ficin from the tin oxide gel.

6. A process for the purification of crude bromelain which comprises the steps of:
    mixing stannous chloride with a solution of crude bromlain;
    adding ammonium hydroxide in sufficient quantity to increase the pH of the mixture and form a tin oxide gel; and
    separating the water-soluble bromelain from the tin oxide gel.

7. A process for the purification of plant proteases which comprises the steps of:
    mixing a water-soluble stannous salt with a solution of the plant protease to be purified;
    adding an alkaline salt in sufficient quantity to increase the pH of the solution and form a tin oxide gel;
    separating the water-soluble plant protease from the tin oxide gel by filtration;
    passing the filtrate containing the purified plant protease through a column containing a granular hydrophilic insoluble substance made by crosslinking the polysaccharide dextran; and
    isolating the plant protease from the filtrate so treated.

8. The process of removing impurities from plant proteases which comprises contacting an aqueous solution of the plant protease with a tin oxide gel.

References Cited in the file of this patent

Methods in Enzymology, vol. I, pages 90–98 (1955), Academic Press Inc., publishers, N.Y.